(12) United States Patent
Pedersen

(10) Patent No.: US 8,078,689 B2
(45) Date of Patent: Dec. 13, 2011

(54) METHODS AND APPARATUS FOR PROVIDING ACCESS TO PERSISTENT APPLICATION SESSIONS

(75) Inventor: Bradley Pedersen, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 35 days.

(21) Appl. No.: 12/563,275

(22) Filed: Sep. 21, 2009

(65) Prior Publication Data

US 2010/0011113 A1  Jan. 14, 2010

Related U.S. Application Data

(63) Continuation of application No. 10/683,548, filed on Oct. 10, 2003, now Pat. No. 7,594,018.

(51) Int. Cl.
*G06F 15/16* (2006.01)
*H04L 9/32* (2006.01)

(52) U.S. Cl. ........ 709/217; 709/227; 709/228; 713/161; 713/168; 713/170

(58) Field of Classification Search .................. 709/217, 709/227, 228; 713/161, 168, 170
See application file for complete search history.

(56) References Cited

U.S. PATENT DOCUMENTS

| | | |
|---|---|---|
| 5,606,668 A | 2/1997 | Shwed |
| 5,835,726 A | 11/1998 | Shwed et al. |
| 5,987,611 A | 11/1999 | Freund |
| 6,085,247 A | 7/2000 | Parsons et al. |
| 6,321,337 B1 | 11/2001 | Reshef et al. |
| 6,452,915 B1 | 9/2002 | Jorgensen |
| 6,463,470 B1 | 10/2002 | Mohaban et al. |
| 6,466,984 B1 | 10/2002 | Naveh et al. |
| 6,496,935 B1 | 12/2002 | Fink et al. |
| 6,584,569 B2 | 6/2003 | Reshef et al. |
| 6,625,643 B1 | 9/2003 | Colby et al. |
| 6,640,248 B1 | 10/2003 | Jorgensen |
| 6,718,380 B1 | 4/2004 | Mohaban et al. |
| 6,772,347 B1 | 8/2004 | Xie et al. |
| 6,850,943 B2 | 2/2005 | Teixeira et al. |
| 6,856,651 B2 | 2/2005 | Singh |
| 6,873,988 B2 | 3/2005 | Herrmann et al. |
| 6,901,075 B1 | 5/2005 | Baron |
| 6,920,502 B2 | 7/2005 | Araujo et al. |
| 7,136,645 B2 | 11/2006 | Hanson et al. |

(Continued)

FOREIGN PATENT DOCUMENTS

JP  8-63419  3/1996

(Continued)

OTHER PUBLICATIONS

Anonymous: "Citrix Metaframe 1.8—Backgrounder", Internet Publication, Apr. 24, 1999, XP002217973.

(Continued)

*Primary Examiner* — Frantz B Jean
(74) *Attorney, Agent, or Firm* — Foley and Lardner LLP; John D. Lanza

(57) ABSTRACT

Methods and apparatus for providing remote access to two or more application sessions in which authentication information associated with a user is received, a plurality of application sessions already associated with the user are identified in response to the information, and a client computer operated by the user is connected to the plurality of application sessions.

20 Claims, 4 Drawing Sheets

U.S. PATENT DOCUMENTS

| | | |
|---|---|---|
| 7,143,437 B2 | 11/2006 | Royer et al. |
| 2001/0037387 A1 | 11/2001 | Gilde et al. |
| 2001/0047406 A1 | 11/2001 | Araujo et al. |
| 2002/0032725 A1 | 3/2002 | Araujo et al. |
| 2002/0095584 A1 | 7/2002 | Royer et al. |
| 2002/0138618 A1 | 9/2002 | Szabo |
| 2002/0165971 A1 | 11/2002 | Baron |
| 2003/0055962 A1 | 3/2003 | Freund et al. |
| 2003/0074580 A1* | 4/2003 | Knouse et al. ............... 713/201 |
| 2003/0101343 A1* | 5/2003 | Eaton et al. .................. 713/170 |
| 2003/0177389 A1 | 9/2003 | Albert et al. |
| 2003/0182431 A1 | 9/2003 | Sturniolo et al. |
| 2003/0198189 A1 | 10/2003 | Roberts et al. |
| 2003/0212904 A1* | 11/2003 | Randle et al. ............... 713/200 |
| 2003/0233581 A1 | 12/2003 | Reshef et al. |
| 2004/0010621 A1 | 1/2004 | Afergan et al. |
| 2004/0107360 A1 | 6/2004 | Herrmann et al. |
| 2004/0111642 A1 | 6/2004 | Peles |
| 2004/0158429 A1 | 8/2004 | Bary et al. |
| 2004/0162876 A1 | 8/2004 | Kohavi |
| 2004/0177247 A1 | 9/2004 | Peles |
| 2004/0250124 A1 | 12/2004 | Chesla et al. |
| 2005/0027837 A1* | 2/2005 | Roese et al. ................. 709/223 |
| 2005/0050362 A1 | 3/2005 | Peles |
| 2005/0086206 A1 | 4/2005 | Balasubramanian et al. |
| 2005/0120054 A1 | 6/2005 | Shulman et al. |
| 2005/0132030 A1 | 6/2005 | Hopen et al. |
| 2005/0144481 A1 | 6/2005 | Hopen et al. |
| 2005/0188215 A1 | 8/2005 | Shulman et al. |
| 2005/0262063 A1 | 11/2005 | Conboy et al. |
| 2006/0029016 A1 | 2/2006 | Peles |
| 2009/0187968 A1* | 7/2009 | Roese et al. ..................... 726/1 |

FOREIGN PATENT DOCUMENTS

| | | |
|---|---|---|
| JP | 10-336272 | 12/1998 |
| JP | 2000-207362 | 7/2000 |
| JP | 2002-149597 | 5/2002 |
| WO | WO-02/23362 A1 | 3/2002 |
| WO | WO-02/37267 | 5/2002 |

OTHER PUBLICATIONS

European Patent Office Official Action, App. No. 04 783 774.5-1243, Ref. P45221-/CAM/SWL, Mar. 13, 2007.

European Search Report for European Application No. 08 00 9196, date of completion Oct. 23, 2008. (7 pages).

Examiner's First Report for Australian Application No. 2004281457 dated Aug. 28, 2009 (3 pages).

Examiner's First Report for EP Application No. 08009196 dated May 28, 2009 (1 page).

Examiner's First Report for Indian Application No. 903/KOLNP/2006 dated May 27, 2008 (7 pages).

Final Office Action for U.S. Appl. No. 10/683,548 dated Oct. 15, 2007 (15 pages).

International Search Report to PCT/US2004/029684 (Aug. 4, 2005) 3 pages.

Non-Final Office Action for U.S. Appl. No. 10/683,548 dated May 3, 2007 (12 pages).

Non-Final Office Action for U.S. Appl. No. 10/683,548 dated May 30, 2008 (14 pages).

Notice of Allowance for U.S. Appl. No. 10/683,548 dated May 15, 2009 (6 pages).

Official Action for JP Application No. 2006-533906 dated Jul. 28, 2010 (60 pages).

Tierling E: "Gezaehmtes Monster" CT Magazin Fuer Computer Technik, Verlag Heinz Heise GMBH., Hannover, DE, No. 10, 1998, pp. 226-228, 230, 23, XP000740851 ISSN: 0724-8679 the whole document.

Written Opinion of the International Searching Authority to PCT/US2004/029684 (5 pages).

Canadian Office Action for CA Appl. No. 2,541,987 dated Jan. 31, 2011, 5 pages.

Official Action for JP Application No. 2006-533906 dated Jul. 28, 2010, 60 pages.

* cited by examiner

METHODS AND APPARATUS FOR PROVIDING ACCESS TO PERSISTENT APPLICATION SESSIONS

TECHNICAL FIELD

The present invention generally relates to computer networking software, and more specifically to methods and apparatus for providing access to persistent application sessions.

BACKGROUND

Technologies for providing remote access to networked resources include a variety of server/client software combinations. MetaFrame™ server software in communication with Intelligent Computing Architecture (ICA) clients, available from Citrix Systems, Inc., Ft. Lauderdale, Fla., and X Servers in communication with X Windows clients available from the X Consortium are two examples that provide remote access to applications executing on a server.

Computer user behavior and the stability of network communication channels over which their computers communicate are often unpredictable. Networked users on occasion need to change computing environments while forgetting to, or without having the opportunity to fully save their work product or to shut down their systems. In other cases, communication channels unexpectedly fail or computers crash, which can result in the loss of work product, if the session is not restored or terminated gracefully.

Failing to gracefully cease usage of a shared network resource can lead to a variety of difficulties for networked application users. Many software applications restrict other users' ability to use shared network resources, such as data files, while a resources is in use, usually to prevent conflicting manipulation of the resource. For example, documents can be "checked out" while being edited by a user so that another user does not attempt to simultaneously edit the document, or use a stale copy of the document. If a user checks out a document while working from one computer, and then leaves the computer without subsequently "checking it in," the document can be rendered inaccessible to everyone without intervention by an administrator. And typically, upon such intervention, the changes made to the document are lost.

SUMMARY OF THE INVENTION

One object of the present invention is to provide computer users flexible access to persistent networked resources to reduce the risk of wasted time and effort that user, hardware, and network unpredictability can create by allowing users to connect to disconnected application sessions and to and to enable efficient and convenient use of networked resources by changing locations and/or computing environments. In some embodiments, there can be multiple applications sessions, and some of the multiple applications sessions can be running on multiple servers.

In general, in one aspect, the invention relates to a method for providing remote access to a plurality (e.g., two or more) of application sessions includes receiving authentication information associated with a user. The method also includes identifying a plurality of application sessions already associated with the user in response to the information. The method also includes connecting a client computer operated by the user to the identified plurality of application sessions in response to the received information.

In general, in another aspect, the invention relates to an apparatus, such as a server, for providing remote access to an application session. The server includes a network module for receiving authentication information associated with a user that is operating a client computer. The server includes a data store for listing a plurality of application sessions associated with the user. The server also includes a server process for connecting the client computer to the plurality of application sessions enumerated in the data store in response to the received information.

BRIEF DESCRIPTION OF THE DRAWINGS

The foregoing discussion will be understood more readily from the following detailed description of the invention, when taken in conjunction with the accompanying drawings.

DETAILED DESCRIPTION

Figure 1:
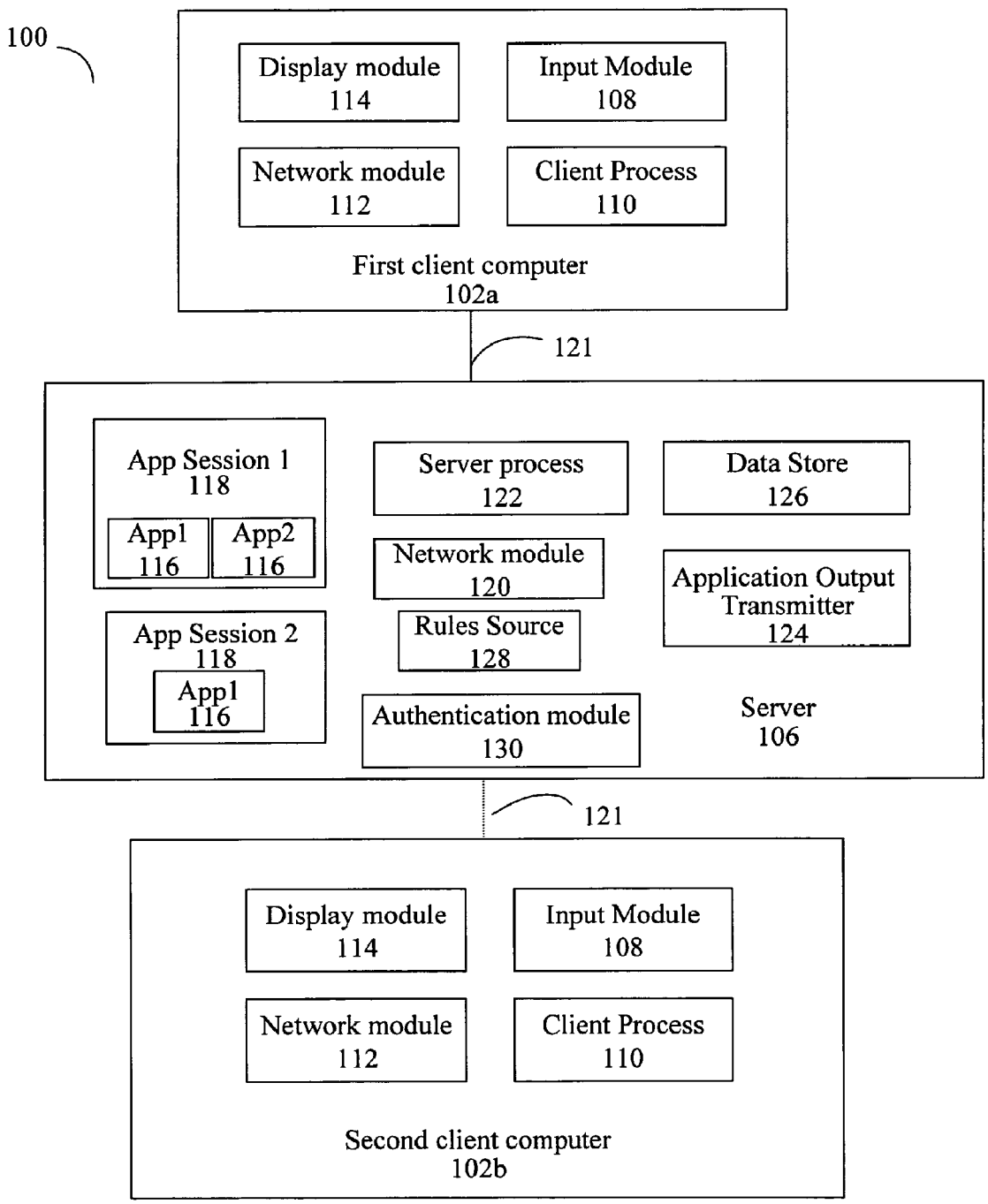
FIG. 1 is a schematic diagram depicting a networked client-server computing system.

Referring to FIG. 1, a client-server computer system 100 includes a first client computer 102a, a second client computer 102b, and a server 106. The depiction of two client computers is for illustrative purposes only. The client-server computer system can include any number of client computers. The term computer can refer to a workstation, desktop computer, laptop, handheld computer, or any other form of computing or telecommunications device that is capable of communication and that has sufficient processor power, memory capacity, and human interface capabilities to perform the operations described herein (e.g, a mobile phone or personal digital assistant).

In one embodiment, the first client computer 102a includes an input module 108, a client process 110, a network module 112, and a display module 114. The input module 108 provides an interface for a user of the first client computer 102a to interact with the first client computer 102a, for example to request the remote execution of an application 116 in an application session 118 from the server 106.

An application session 118 is a process, operating on the server 106, that supports the execution of one or more applications 116. An application 116 can be a software program, for example, or any organized set of software code capable of being executed by a computer, or hardwired into circuitry in the form of an Application Specific Integrated Circuit (ASIC), read only memory (ROM) microchip, and the like. Example applications include, but are not limited to Microsoft Word (available from Microsoft Corporation Redmond, Wash.), Internet Explorer (Microsoft), Acrobat (available from Adobe Systems, Inc. San Jose, Calif.), etc. In one embodiment, an application session 118 includes a desktop application 116 from which the execution of other applications 116 can be initiated. Application sessions 118 can be nested within other application sessions 118. In another embodiment, the application session 118 includes an instance of the execution of a single application 116.

The execution of applications 116 in application sessions 118 on a remote server 106 allows computer users and administrators to take advantage of centralized computing power and software consistency. While the capabilities of computing devices have rapidly been increasing, the amount of computing resources needed to efficiently operate computer software, the desire for mobile computing, and the use of smaller, less capable computing devices also continues to increase. For example, users increasingly desire the ability to access computationally intensive applications from handheld computing devices such as personal digital assistants (PDAs), and even mobile telephones. In addition an enterprise computing setting, administrators often want to ensure that all users utilize the same version of a software program, regardless of where the users are working. Moreover, some applications require close proximity to other resources (e.g., network disks, printers, communications links).

For these reasons and others, computer users and administrators are increasingly turning to using remotely executing software applications to address some of these concerns. For example, a low-resource, minimally functional computing device, such as a Personal Digital Assistant (PDA) can connect to a remote server, initiate an application session, launch a computationally intensive application, and interact with the application through the PDA, by having the computationally intensive application execute using the resources of the server. As long as the PDA has sufficient display and input capabilities, remote access can greatly decrease the computational limitations of the device. In another example, an employee can access from his or her home computer an application that ordinarily is only available through the employee's desktop computer by connecting to a remote server. As with the previous example, the execution of the application occurs on the remote server through an application session. The remote access to the application relieves the employee of the need to install the application on his or her home computer. It also satisfies the desire of the system administrator of the employee's company to ensure employees use the same version of an application from whichever computer they may want to use it.

In one embodiment, the input module 108 is, for example, a graphical user interface that provides one or more icons or menu selections for a user to select. Each icon or menu selection represents a specific application 116 available for remote execution. Selecting an icon or menu selection initiates the transmittal of a log-on request to the server 106 for access to that application 116. In another embodiment, an icon or menu selection does not represent any specific application 116, but instead represents a general server 106 log-on procedure. In another embodiment, the input module 108 is non-graphical user interface. In this embodiment, the user can enter a command to send a log-on request to server 106. Entering a command can include typing a predefined set of characters or depressing a specified key sequence on an input device (e.g., a keyboard or keypad). The log-on request at least includes user-provided authentication information. The input module 108 accepts the input of the user-provided authentication information, which can include any type of authentication information, including without limitation any of user name-password/PIN combinations, voice samples, one-time passcodes, biometric data, digital certificates, smart card data, etc. In some embodiments, the input module 108 is in communication with additional hardware peripherals (not shown) to facilitate acceptance of user authentication information. In other embodiments, the input module 108 can accept authentication information outside of the log-on process.

The input module 108 accepts authentication information and provides it to the client process 110. The client process 110 then manages the client side functionality of the remotely executing application session. The client process 110 forwards user input including the authentication information and requests for termination or disconnection of application sessions 118 to the server 106. The client process 110 also handles data incoming from the server 106, for example, by forwarding the graphical output of an application session 118 to the display module 114.

The network module 112 provides for communication between the first client computer 102a and the server 106. The network module sends user input, such as authentication information and requests for access to, disconnection from, or termination of application sessions 118 executing on the server 106. The network module also receives output from the application sessions 118 and forwards the output to the client process 110. In one embodiment, the network module 112 encapsulates user input into, and reconstitutes application session output from, a predetermined protocol for transmission to the server 106. In another embodiment, the network module encrypts outgoing transmissions and decrypts incoming transmissions.

The display module 114 displays the output of an application 116 from a remotely-executing application session 118. In one embodiment, the display module 114 forwards output video data received from the client process 110 directly to a display, such as a cathode ray tube (CRT) display, liquid crystal display (LCD) screen, plasma display, projector, or other suitable form of display device. In another embodiment, the application output is encrypted, encapsulated in a protocol, or both. In this embodiment, the display module 114 first manipulates the application output so that the output can be interpreted by a standard display adapter such as a computer video card. In another embodiment, the display module 114 includes the standard display adapter.

In one embodiment, the server 106 is a single computer that has sufficient processing capability to perform the tasks described here. Preferably the server is a server-class computer running a multiprocessing operating system, such as Windows XP Professional, Mac OS X Server (available from Apple Computer, Inc., Cupertino, Calif.), Unix-based operating systems (e.g., Solaris, Sun Microsystems, Sunnyvale, Calif.), or other suitable operating system. In another embodiment, the server 106 includes multiple connected computers. In a further embodiment, the multiple computers of the server 106 are configured as a "server farm." In general, a server farm is a group of servers that are linked together to appear to users and/or administrators as a single server system and typically have centralized administration. One illustrative server farm configuration is described in greater detail in United States Patent Application Publication No. 2001/0049717 A1, published on Dec. 6, 2001 and entitled "A Method and Apparatus for Communication Among a Network of Servers." Of course, it will be apparent that there are many configurations of server farms that would also be useful for embodiments of the invention. In one embodiment, the server 106 includes a network module 120, a server process 122, an application output transmitter 124, and a data store 126, a rules source 128, and an authentication module 130.

The network module 120 provides communication functionality for the server 106. For example, the network module 120 receives communications from first and second client computers 102a and 102b over one or more data networks or links 121. The network module 120 also transmits application output data to the first and second client computers 102a and 102b. In one embodiment, the network module 120 encrypts outgoing communications and decrypts incoming communications. Likewise, in one embodiment, the network module 120 encapsulates outgoing communications in a protocol for transmission and retrieves incoming data from transmissions received according to a protocol. Protocols can include, for example and without limitation, HTTP, Independent Computing Architecture (ICA) protocol (used by Citrix, Systems, Inc. Ft. Lauderdale, Fla.), Remote Desktop Protocol (RDP) (Microsoft Corporation), or Common Gateway Protocol (CGP) (Citrix). The network module 120 of the server 106 communicates with the network module 112 of the first client computer 102a over a network 121. The network 121 can be implemented with any of a variety of suitable technologies, for example, over standard telephone lines, LAN or WAN links (using, e.g., 802.11, T1, T3, 56 kb, or X.25 protocols), broadband connections (using, e.g., ISDN, Frame Relay, or ATM protocols), and wireless connections, or some combination of any or all of the above. Incoming communications, once decrypted or retrieved from a protocol (if necessary), are forwarded to an application session 118 or to the server process 122, as appropriate.

The server process 122 manages the execution and termination of application sessions 118 and the connections and disconnections of those application sessions 118 to the first and second client computers 102a and 102b. The server process 122 can initiate new application sessions 118, disconnect a client computer 102a or 102b from an application session 118, detect a client computer 102a or 102b disconnection from an application session 118, locate an application session 118 from which a user has disconnected, locate an application to which a user of the first client computer 102a is connected to from the second client computer 102b, and connect a user to a disconnected application session 118. Preferably, the application sessions 118 are provided so as to be configured with the user's personal preferences and access allowances.

The application output transmitter 124 transmits output from an application session 118 to a client computer 102a or 102b through the network module 120. The application output transmitter 124 intercepts the output of an application session 118 and determines which client computer 102a or 102b is connected to the application session 118. If the application session 118 is connected to a client station, the application output transmitter 124 transmits the application output data to the connected client computer 102a or 102b via the network module 120. In one embodiment, if the application session is not connected to a client computer 102a or 102b, the application output transmitter 124 discards the application output data and waits to receive future application output data. In another embodiment, if the application sessions 118 is not connected to a client computer 102a or 102b, the application output transmitter 124 disregards all further application output data until the application output transmitter 124 receives notification that the application session 118 has connected to a client computer 102a or 102b. In another embodiment, the application output transmitter 124 stores the data until the application output transmitter 124 receives notification that the application session 118 has connected to a client computer 102a or 102b. In another embodiment, the application output transmitter 124 attempts to send application output data to a client computer 102a or 102b until the server process 122 notifies the application output transmitter 124 that the client computer 102a or 102b is disconnected from the server 106. In one embodiment, the application output transmitter 124 determines which client computer 102a or 102b, if any, the application session 118 is connected to by consulting the data store 126.

The data store 126 includes information related to application sessions initiated by users. The data store can be stored in volatile or non-volatile memory or, for example, distributed through multiple servers. Table 1 shows the data included in a portion of an illustrative data store 126.

| | App Session 1 | App Session 2 | App Session 3 |
|---|---|---|---|
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative data store 126 in Table 1 includes data associating each application session 118 with the user that initiated the application session 118, an identification of the client computer 102a or 102b, if any, from which the user is currently connected to the server 106, and the IP address of that client computer 102a or 102b. The illustrative data store 126 also includes the status of each application session. An application session 118 status can be, for example, "active" (meaning a user is connected to the application session 118), or "disconnected" (meaning a user is not connected to the application session). In an alternative embodiment, an application session status can also be set to "executing-disconnected" (meaning the user has disconnected from the application session 118, but the applications in the application session 118 are still executing), or "stalled-disconnected" (meaning the user is disconnected and the applications 116 in the application session 118 are not executing, but their operational state immediately prior to the disconnection has been stored). The data store 126 further stores information indicating the applications 116 that are executing within each application session 118 and data indicating each application's 116 process on the server. In embodiments in which the server 106 is a server farm, the data store 126 is at least a part of the dynamic store, and also includes the data in the last two rows of Table 1 that indicate on which server in the server farm each application 116 is/was executing, and the IP address of that server. In alternative embodiments, the data store 126 includes a status indicator for each application 116 in each application session 118.

For example, in the example of Table 1, three application sessions 118 exist, App Session 1, App Session 2, and App Session 3. App Session 1 is associated with User 1, who is currently using terminal 1. Terminal one's IP address is 172.16.2.50. The status of App Session 1 is active, and in App Session 1, a word processing program, is being executed. The word processing program is executing on Server A as process number 1. Server A's IP address is 172.16.2.55. App Session 2 in Table 1 is an example of a disconnected application session 118. App Session 2 is associated with User 2, but App Session 2 is not connected to a client computer 102a or 102b. App Session 2 includes a database program that is executing on Server A, at IP address 172.16.2.55 as process number 3. App Session 3 is an example of how a user can interact with application sessions 118 operating on different servers 106. App Session 3 is associated with User 1, as is App Session 1. App Session 3 includes a spreadsheet program that is executing on Server B at IP address 172.16.2.56 as process number 2, whereas the application session 118 included in App Session 1 is executing on Server A.

In one embodiment, server 106 also includes a rules source 128. The rules source 128 stores rules governing the reaction of the server process 122 to a user transmitting authentication information to the server 106. In one embodiment, the rules stored in the rules source 128 are specified at least in part by the system administrator. In another embodiment, a user specifies at least some of the rules stored in the rules source 128. The user-specified rule(s) are stored as preferences. The rules source 128 can be stored in volatile or non-volatile memory or, for example, distributed through multiple servers.

One rule stored in the rule source 128, for example, might require or forbid automatic connection to disconnected application sessions 118. Another rule might require or forbid automatic connection to active application sessions 118 currently connected to a different client computer 102a or 102b. Yet another rule might make connection and/or connection contingent on the client computer 102a or 102b that requests access being within a secure network. A further rule might only allow connection to application sessions 118 after receiving user approval. Another rule might only allow connection for a predetermined time after disconnection. Still another rule only allows connection to application sessions 118 that include specific applications 116.

The authentication module 130 is responsible for authenticating a user that attempts to log on to the server 106. The authentication module 130 receives user-provided authentication information transmitted from the first client computer 102a. The authentication module 130 then authenticates the user based on the user-provided authentication information. In response to a successful authentication, the authentication module 130 transmits the results of the authentication process (e.g., allow or deny access, the user's system ID, client computer ID, user access permissions, etc.) to the server process 122.

In one embodiment, the above-described modules and processes of the server 106 (i.e., the network module 120, the server process 122, the application output transmitter 124, and the authentication module 130) and a client computer 102a or 102b (i.e. the input module 108, the client process 110, the network module 112 and the display module 114) are all implemented in software executable on one of several computer operating systems, including without limitation the Windows family of operating systems (Microsoft Corporation), the MacOS family of operating systems (Apple Computer, Inc., Cupertino, Calif.), and Unix based operating systems (e.g., Solaris, Sun Microsystems, Sunnyvale, Calif.). In other embodiments, one or more modules or processes are implemented in hardware as application specific integrated circuits (ASICs), Read Only Memory (ROM) devices, or other digital hardware circuitry.

Unintentional termination of application sessions 118 resulting from imperfect network connections and users' failure to terminate their application sessions 118 themselves can lead to user difficulties. One embodiment of the invention limits these difficulties by differentiating disconnection (which is treated as if the user is not done working with an application session 118) from termination (which is assumed to be an intentional end to the application session) and by correlating application sessions 118 with users as opposed to client computers. When a user is finished using an application 116 operating in an application session 118, the user can terminate an application session 118. Termination generally involves the affirmative input of the user indicating that the server should no longer maintain the application session 118. Such affirmative user input can include selecting an "Exit" option from a menu, clicking on an icon, etc. In response to the server process 122 receiving a termination request, the execution of the application session 118 and any application 116 within that application session 118 is halted. In one embodiment, data related to the application session 118 is also removed from the data store 126.

Disconnection, either intentional or unintentional, on the other hand, does not result in termination of application sessions 118. Since the application or applications operating in an application session 118 are executing on the server 106, a connection to the first client computer 102a is not usually necessary to continue execution of the applications 116, and in one embodiment the applications 116 can continue to execute while waiting for the user to connect. In an alternative embodiment, upon disconnection of a user, the server process 122 stalls the execution of the applications 116 operating in the application session 118. That is, the server process 122 halts further execution of the applications 116, and the server process 122 stores the operational state of the application 116 and any data the application 116 is processing. In a further embodiment, the server process 122 can selectively stall execution of specific applications 116 after a user disconnects. For example, in one embodiment, the server continues execution of an application 116 for a fixed time period, and if a user fails to connect within that time period, the server process 122 stalls the application 116. In another embodiment, the server stalls specified application sessions 118 that cannot continue executing without user input. In each of the above-described embodiments, if the user of the first client computer 102a disconnects from the server 106 and then connects to the server 106 while operating the first client computer 102a, the second client computer 102b, or a third client computer, the server process 122 can connect the client computer operated by the user to one or more previously initiated, non-terminated application session(s) 118 associated with the user, and reinitiate execution of any stalled applications 116.

In one embodiment, the server process 122 detects a disconnection. A user can intentionally and manually instruct the server to disconnect an application session 118 from the client computer 102a or 102b that the user is communicating from. For example, in one embodiment, application sessions 118 provide a menu option for disconnection (as distinguished from termination above) that a user can select. The server process 122 can also detect an unintentional disconnection. For example, in one embodiment, the network module 120 of the server 106 informs the server process 122 when a predetermined number of data packets transmitted by the network module 120 to a client computer 102a or 102b have not been acknowledged by the client computer 102a or 102b. In another embodiment, the client computer 102a or 102b periodically transmits a signal to the server 106 to confirm that a connection is still intact. If the server process 122 detects that a predetermined number of expected confirmation signals from a client computer 102a or 102b have not arrived, the server process 122 determines that the client computer 102a or 102b has disconnected. If the server process 122 detects that a user has disconnected from an application session 118, either intentionally, or unintentionally, the entry in the data store 126 related to the disconnected application session 118 is modified to reflect the disconnection.

Figure 2:
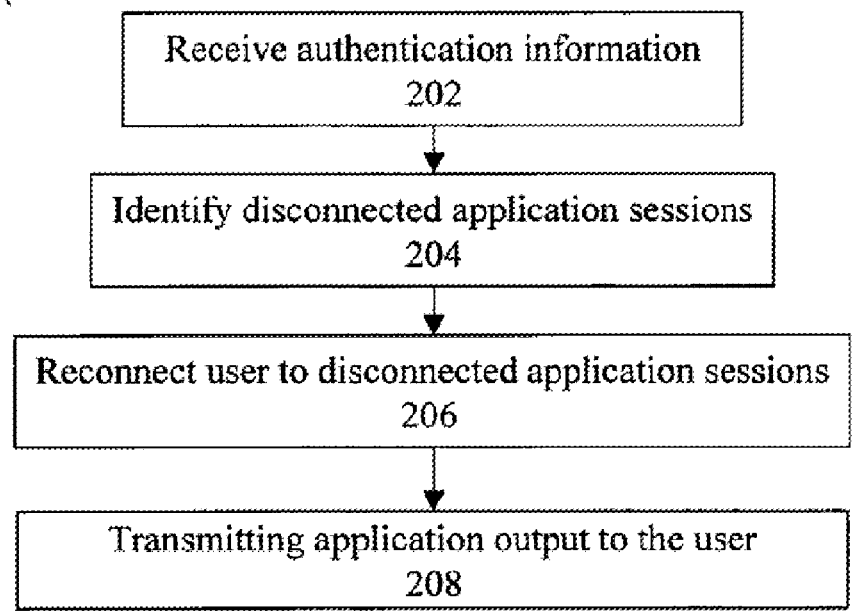
FIG. 2 is a flow chart depicting a method for connecting a client to persistent application session.

Referring also to FIG. 2, a method 200 of providing remote access to an application session, in one embodiment, begins with the network module 120 of the server 106 receiving authentication information associated with a user (step 202). Authentication information can include a number of types of authentication information, including without limitation user names, client names, client addresses, passwords, PINs, voice samples, one-time passcodes, biometric data, digital certificates, tickets, etc. and combinations thereof. The authentication information could be in the form of a log-on request from a user. As described above, a log-on request can be initiated by a user through the input module 108 of a client computer 102a or 102b. The client's network module forwards the request to the server process 122.

In one embodiment, upon receiving the request, the server process 122 forwards the user-provided authentication information to the authentication module 130, which authenticates the identity of the user. The server's authentication module 130 can perform the authentication itself and/or in cooperation with one or other modules or computers, such as a domain server, an authentication service, etc. Successful authentication results in the authentication module transmitting identification information for the user (e.g., a username or ID) to the server process 122.

In response to receiving authentication information associated with the user the server process 122 identifies any disconnected application sessions 118 associated with the user that are executing or stalled on the server 106 (step 204). In one embodiment, the server process 122 identifies the application sessions 118 upon receiving the authentication information. In another embodiment, the server process identifies the applications in response to receiving the authentication information after the authentication module 130 verifies of the user's identity. In one embodiment, server process 122 determines whether any such disconnected application sessions 118 exist by consulting the data store 126 for sessions related to the user. For example, the disconnected application session 118 could have been disconnected by direction of the user of the application session 118, resulting in the server process 122 disconnecting the application session 118, for example, by modifying the status of application session 118 in the data store 126 to "disconnected," and deleting the identification of the connected client computer 102a or 102b in the data store 126 entry for the application session 118. In another embodiment, the disconnection was unintentional. Unintentional disconnection results in the server process 122 making the same modifications to the data store 126 as would be made as a result of an intentional disconnection.

Upon identifying any disconnected application sessions 118 (step 204), in one embodiment, the server process 122 prompts the user to indicate whether connection is desired. If connection is not desired, the server process 122 prompts to user to indicate whether the disconnected applications sessions 118 should remain disconnected, or whether the application sessions 118 should be terminated. In an alternative embodiment, the server process 122 consults a rule stored in the rules source 128 to determine whether connection and/or connection is permitted and/or required.

In an alternative embodiment, the user connects to the server 106, the server process 122, and any disconnected application sessions by utilizing a single user interface element, for example clicking an icon labeled "Log-on." In this embodiment, activating the single user interface will automatically connect the user to any disconnected applications sessions 118.

In one embodiment, the client can be configured to automatically send authentication information upon such user connection. If connection is permitted, and is either assented to by user or is automatic, the server process 122 connects the user to the disconnected application sessions (step 206). In one embodiment, connection includes modifying the entry in the data store 126 to indicate that the user is connected to the application session 118 and to indicate from which client computer 102a or 102b the user is connected to the server. Upon connection, the server 106 resumes transmitting application output data from the application output transmitter 124 to the client 102a or 102b. In another embodiment, the application output transmitter consults the rules source 128 before beginning transmitting application output to ensure such transmission is permitted.

Application sessions are associated primarily with users instead of the client computer 102a or 102b which the user was operating when the user previously had connected to, (and then been disconnected from) the server. As a result, rules permitting, the user can reconnect to an application session 118 from the first client computer 102a, the second client computer 102b, or any other client computer.

Figure 3:
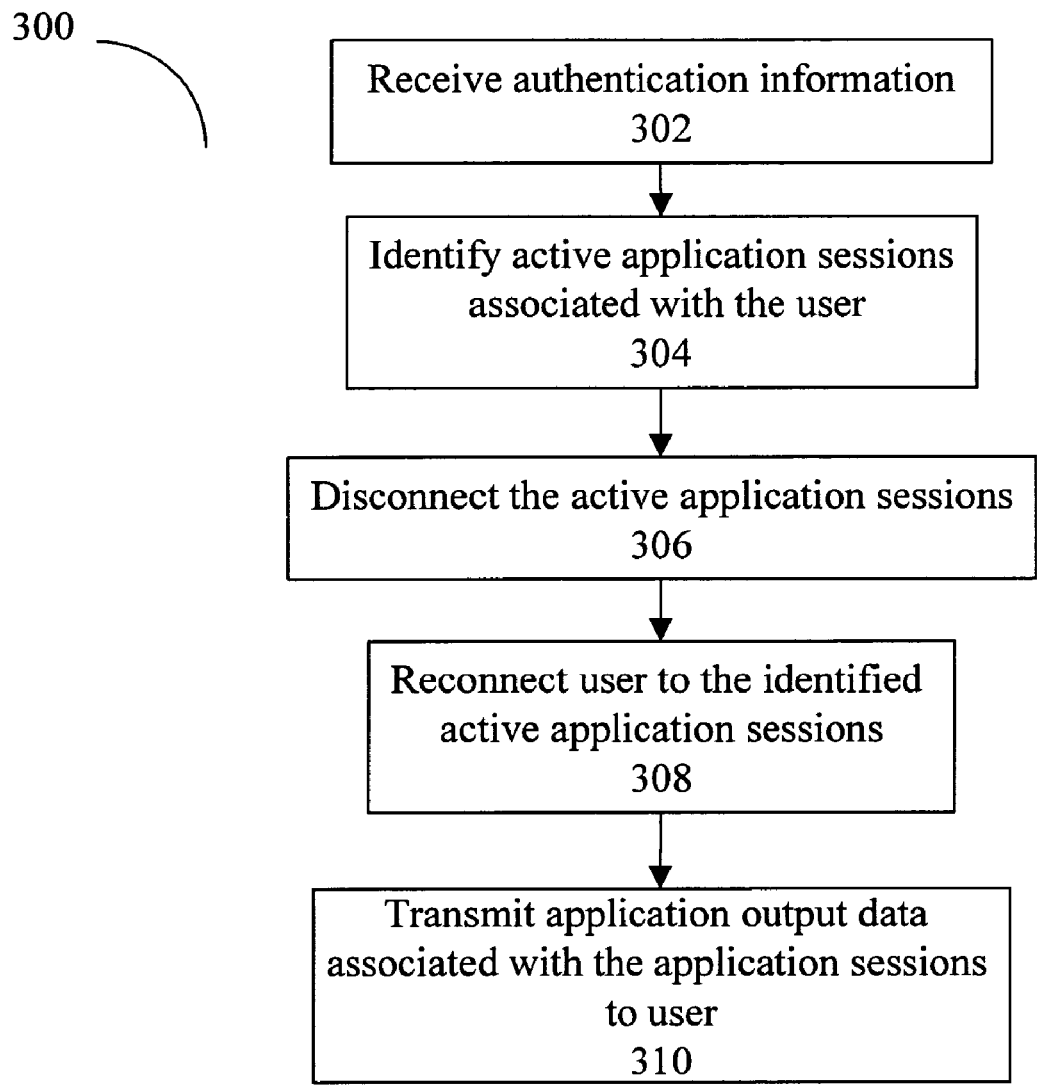
FIG. 3 is a flow chart depicting a method for pulling persistent application sessions.

Referring to FIG. 3, even if a session is not disconnected (i.e., is active) it can be useful to transfer the session from one client to another. For example, it may be that an application session was disconnected, but the server did not yet detect the disconnection. It may be that the user deliberately left a session running, but would now like to access the session from another location.

A method 300 for transferring active application sessions 118 from a first client computer 102a to a second client computer 102b typically begins with the network module 120 receiving authentication information from a user, for example in the form of a log-on request. In one embodiment, the user submits the authentication information via the input module 108. The authentication information can be transmitted by the network module 112 of second client computer 102b to the server 106. The network module 120 of the server 106 can forward the request to the server process 122.

The server process 122 receives the user-provided authentication information (step 302). In one embodiment, the server process 122 forwards the user-provided authentication information to an authentication module 130, which authenticates the identity of the user using, for example, any of the variety of authentication techniques described above. Successful authentication results in the authentication module transmitting for example, identification information for the user to the server process 122.

After receiving authentication information (step 302), the server process consults the data store 126 to identify any active application sessions 118 that are associated with the user, but that are connected to a different client computer, such as the first client computer 102a as an illustrative example (step 304). In one embodiment, if the server process 122 identifies any such active application sessions 118, the server process automatically disconnects the application session(s) 118 from the first client computer 102a (step 306) and connects the application session(s) 118 to the current client computer 102b (step 308). In one embodiment, the user can trigger the automatic consultation of the data store and subsequent connection with the selection of a single user interface element.

In an alternative embodiment, the server process 122 prompts the user as to whether the user wants to have the active application session(s) 118 connected to the current client computer 102b. If the user declines to transfer one or more of the active application session(s), the server process 122 prompts the user to either keep the application session(s) 118 active, or to terminate the application session(s) 118. In an alternative embodiment, the server process 122 consults a rule stored in the rules source 128 to determine whether transfer of the active application session(s) 118 are permitted before transferring the active application session(s) 118.

If transfer of the application session(s) 118 are permitted and transfer is automatic or requested by the user, in one embodiment the server process 122 carries out the disconnection (step 306) and connection (step 308) by modifying the entry maintained in the data store 126 for the application session 118 to substitute the identity of the stored client computer 102a with the identity of the current client computer, i.e. the second computer 102b. Upon connection to the current client computer 102b, the application output transmitter 124 begins transmitting application output to the current computer (step 310). In another embodiment, the application output transmitter consults the rules source 128 before beginning transmitting application output to ensure such transmission is permitted.

It should be understood that the methods of FIG. 2 and FIG. 3 can be combined to allow a client to be connected to both disconnected and active sessions associated with a user. In addition, prior to transfer or reconnection, the active and/or disconnected sessions could have been connected to the same or several different client computers.

Figure 4:
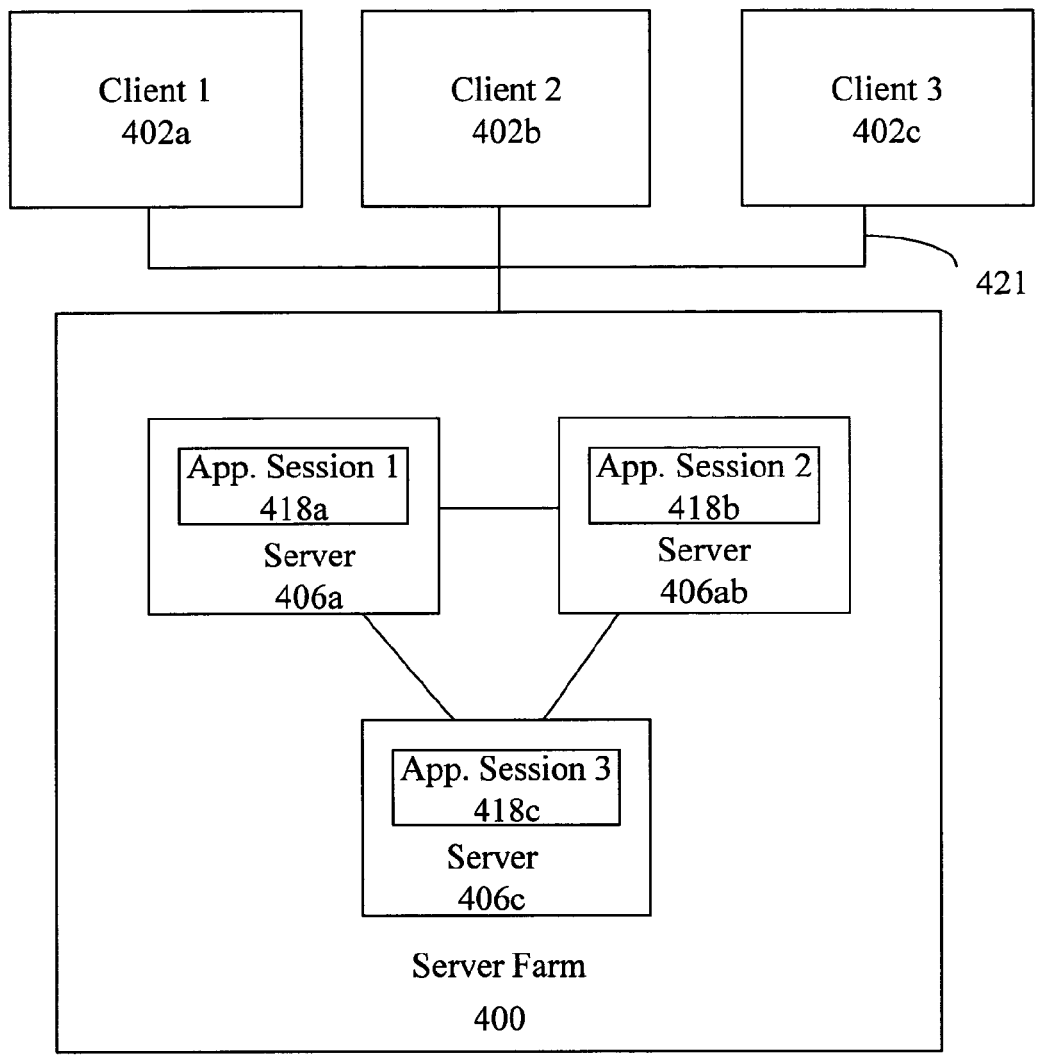
FIG. 4 is a schematic diagram depicting a networked client-server farm computing system.

Referring to FIG. 4, as mentioned above, the server 106 can be implemented as a server farm 400. In one embodiment, the server farm includes several servers 406a, 406b, and 406c, which are linked together and which are jointly administered. Several client computers 402a, 402b, and 402c (typically many computers) can connect to the server farm 400 over a network 421. The servers 406a, 406b, and 406c share the computational load put on the server farm 400. For example, if a user is accessing three application sessions 418a, 418b, and 418c, each application session can be executing on a different server 406a, 406b, or 406c. Similarly, if the user is accessing two or more applications 116 through a single application session 418a, 418b or 418c, the server process 122 of the server farm 400 can assign one application to execute on one server 406a and another application to execute on server 406b. In a server farm configuration, the modules of the server 120, 122, and 124, the data store 126, and the rules source 128 (FIG. 1), can be stored on a single server 406a, 406b or 406c, or can be distributed among the servers 406a, 406b, and 406c.

With respect to connecting to the server farm 400 after a disconnection or after changing client computers 402a, 402b and 402c without disconnecting, the server process 122 treats the servers 406a, 406b, and 406c as a single server. That is, if a server farm is executing a user's application sessions 418a, 418b, and 418c on separate servers 406a, 406b, and 406c, and the user disconnects from the server farm 400 or changes the client computer 402a, 402b, or 402c at which the user is working, upon subsequently connecting to the server farm 400, the server process 122 of the server farm 400 can automatically connect the user's client computer 402a, 402b, or 402c with all three application sessions 418a, 418b, and 418c executing on all three severs 406a, 406b, and 406c.

In an illustrative example operation of one embodiment of the of the system, a user of a first client computer 402a, which in this example is a mobile handheld computer, logs on to the server farm 400 via a wireless modem and requests two application sessions 418a and 418b. The server process 122 of the server farm 400 launches a first application session 418a on a first server 406a and a second application session on a second server 406b. The wireless modem loses its connection with the server farm when the user of the first computer 402a enters an elevator. The server process 122 of the server farm 400 determines that the user is disconnected, and the server process 122 updates the data store 126 accordingly.

The user then logs on to the server farm 400 from a second client computer 402b, which in this example is a desktop computer in his office. The server process 122 consults the data store 126 and determines that two disconnected application sessions 418a and 418b are associated with the user. The server process 122 (assuming no rules to the contrary) automatically connects the second client computer 402b to both application sessions 418a and 418b executing on servers 406a and 406b, respectively.

The user then leaves the second client computer 402b without disconnecting from the server farm 400 and logs on to the server farm 400 from a third client computer 402c, for example a colleague's laptop. Upon logging on from the third client computer 402c, the server process consults the data store 126 and determines that the user is associated with the two active application sessions 418a and 418b connected to the second client computer 402b. The server process 122 (assuming no rules to the contrary) then automatically disconnects both of the application sessions 418a and 418b from the second client computer 402b, and connects both of the application sessions 418a and 418b to the third client computer 402c.

The user next selects a disconnect option for each application session 418a and 418b. The server process 122 updates the data store 126 to indicate that the application sessions 418a and 418b have been disconnected. The user then logs on to the server farm 400 from the second client computer 402b. The server process 122 consults the data store 126 and determines that two disconnected application sessions 418a and 418b are associated with the user. The server process 122 (assuming no rules to the contrary) automatically connects the disconnected application sessions 418a and 418b to the second client computer 402b.

One skilled in the art will realize the invention may be embodied in other specific forms without departing from the spirit or essential characteristics thereof. The foregoing embodiments are therefore to be considered in all respects illustrative rather than limiting of the invention. The scope of the invention is not limited to just the foregoing description.

What is claimed is:

1. A method for providing remote access to a plurality of application sessions, the method comprising:
   receiving, by a server, authentication information associated with a user from a first client computer;
   authenticating, by the server, the user using the received authentication information from the first client computer;
   initiating, by the server, an application session for the user;
   receiving, by the server, the authentication information associated with the user from a second client computer;
   authenticating, by the server, the user using the received authentication information from the second client computer;
   identifying, by the server, the application session initiated by the user by accessing a data store comprising information related to a plurality of application sessions;
   determining, via a rule from a rule source, that the user is one of required, permitted and forbidden to connect to the initiated application session;
   disconnecting, by the server, the application session initiated by the user from the first client computer; and
   connecting, by the server, the application session initiated by the user to the second client computer responsive to the determination via the rule from the rule source.

2. The method of claim 1, further comprising setting, by the server, a status of at least one application session of the plurality of application session to one of active and disconnected.

3. The method of claim 2, further comprising further specifying, by the server, the status of the at least one application session of the plurality of application session designated as disconnected as one of executing-disconnected and stalled-disconnected.

4. The method of claim 1, further comprising storing, by the server, the information related to a plurality of application sessions in a table of the data store.

5. The method of claim 1, further comprising storing, by the server, a user-specified rule in the rule source.

6. The method of claim 1, further comprising stalling, by the server, the initiated application session after the user disconnects from the server.

7. The method of claim 1, further comprising continuing, by the server, execution of an application in the initiated application session for a pre-determined time period.

8. The method of claim 7, further comprising stalling, by the server, the application in the initiated application session responsive to exceeding the pre-determined time period and failure to reconnect the server and the user.

9. The method of claim 1, further comprising
requesting, by the server to the second client computer, instructions for connecting the initiated application session to the second client computer; and
receiving, by the server, instructions declining to connect the second client computer to the initiated application session.

10. The method of claim 9, further comprising requesting, by the server to the second client computer, instructions for one of keeping the initiated application session active and terminating the initiated application session.

11. A server for providing remote access to a plurality of application sessions, the method comprising:
a network module for receiving authentication information associated with a user from a first client computer; and receiving the authentication information associated with the user from a second client computer;
an authentication module for authenticating the user using the authentication information received from the user from the first client computer; and authenticating the user using the authentication information received from the user from the second client computer;
a data store for storing information related to a plurality of application sessions;
a rule source for providing one or more rules governing a reaction to receiving authentication information from the user, the one or more rules determining whether to one of require, permit and forbid the user's connection to an identified application session of the plurality of application sessions; and
a server process for initiating an application session for the user; disconnecting the application session initiated by the user from the first client computer; and connecting the application session initiated by the user to the second client computer responsive to the determination via the rule from the rule source.

12. The server of claim 11, wherein the data store sets a status of at least one application session of the plurality of application session to one of active and disconnected.

13. The server of claim 12, wherein the data store further specifies the status of the at least one application session of the plurality of application session designated as disconnected as one of executing-disconnected and stalled-disconnected.

14. The server of claim 11, wherein the data store stores the information related to a plurality of application sessions in a table of the data store.

15. The server of claim 11, wherein the rule source stores a user-specified rule.

16. The server of claim 11, wherein the server process stalls the initiated application session after the user disconnects from the server.

17. The server of claim 11, wherein the server process continues execution of an application in the initiated application session for a pre-determined time period.

18. The server of claim 17, wherein the server process stalls the application in the initiated application session responsive to exceeding the pre-determined time period and failure to reconnect the server and the user.

19. The server of claim 11, wherein the network module
requests instructions from the second client computer for connecting the initiated application session to the second client computer; and
receives instructions declining to connect the second client computer to the initiated application session.

20. The server of claim 19, wherein the network module requests instructions from the second client computer for one of keeping the initiated application session active and terminating the initiated application session.

* * * * *